(12) United States Patent
Hendrick (10) Patent No.: US 10,318,976 B2
(45) Date of Patent: Jun. 11, 2019

(54) METHODS FOR DETERMINING MEASUREMENT DATA OF AN ITEM

(71) Applicant: Walmart Apollo, LLC, Bentonville, AR (US)

(72) Inventor: Christopher Joseph Hendrick, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 199 days.

(21) Appl. No.: 15/204,206

(22) Filed: Jul. 7, 2016

(65) Prior Publication Data

US 2017/0030766 A1 Feb. 2, 2017

Related U.S. Application Data

(60) Provisional application No. 62/197,657, filed on Jul. 28, 2015.

(51) Int. Cl.
*G01G 17/00* (2006.01)
*G06Q 30/02* (2012.01)
*G07G 1/00* (2006.01)

(52) U.S. Cl.
CPC .......... *G06Q 30/0207* (2013.01); *G07G 1/00* (2013.01); *G01G 17/00* (2013.01)

(58) Field of Classification Search
CPC ... G01G 17/00; G06K 2209/17; G07G 1/0063
See application file for complete search history.

(56) References Cited

U.S. PATENT DOCUMENTS

| 5,184,733 | A | * | 2/1993 | Arnarson | A22C 25/00 177/1 |
| 6,508,403 | B2 | | 1/2003 | Arsenault et al. | |
| 8,189,875 | B2 | * | 5/2012 | Nasser | G06T 7/543 382/109 |
| 8,276,490 | B2 | | 10/2012 | Schmidt | |
| 8,690,777 | B2 | | 4/2014 | Lin | |
| 9,406,058 | B1 | * | 8/2016 | Rebeil | G06Q 20/208 |
| 2003/0115160 | A1 | | 6/2003 | Nowlin et al. | |
| 2005/0097064 | A1 | * | 5/2005 | Werden | G01G 19/4144 705/400 |

(Continued)

FOREIGN PATENT DOCUMENTS

WO    WO 2017049346 A1 * 3/2017 ............... G06T 7/60

OTHER PUBLICATIONS

Smart Picture Technologies, "Measuring Made Easy: SmartPicture 2D turns your smartphone into a modern measuring tape", SmartPictureApp.com, accessed on May 25, 2015; 11 pages.

*Primary Examiner* — Natalie Huls
(74) *Attorney, Agent, or Firm* — Schmeiser, Olsen & Watts LLP (57) ABSTRACT

Provided are a system and method for determining a weight of an item for purchase, comprising determining from a digital image of an item generated by a single camera a volume of the item, the single camera separated from the item at a distance in a horizontal and vertical direction established by a stationary rigid fixture; identifying the item; accessing a database to determine an average weight per volume measurement unit of the identified item; and calculating a weight of the item from the volume and the average weight per volume measurement unit.

6 Claims, 5 Drawing Sheets

(56) References Cited

U.S. PATENT DOCUMENTS

| | | | |
|---|---|---|---|
| 2008/0234985 A1 | 9/2008 | Kuwashima et al. | |
| 2010/0222684 A1* | 9/2010 | Hatzilias | G01B 11/25 600/476 |
| 2012/0182543 A1* | 7/2012 | De Baerdemaeker | G01G 9/00 356/54 |
| 2013/0322699 A1* | 12/2013 | Spicola, Sr. | G01G 9/00 382/110 |
| 2014/0104413 A1* | 4/2014 | McCloskey | G06Q 10/083 348/135 |
| 2015/0138538 A1* | 5/2015 | Sakurai | G01J 3/0291 356/72 |
| 2016/0109281 A1* | 4/2016 | Herring | G01G 19/4144 177/1 |
| 2016/0150213 A1* | 5/2016 | Mutti | G01N 33/02 348/143 |
| 2017/0200275 A1* | 7/2017 | McCloskey | G01G 23/35 |
| 2018/0055706 A1* | 3/2018 | Madadin | H04N 5/2251 |
| 2018/0114374 A1* | 4/2018 | Rakow | G01G 19/4148 |

\* cited by examiner

METHODS FOR DETERMINING MEASUREMENT DATA OF AN ITEM

RELATED APPLICATIONS

This application claims priority to U.S. Provisional Patent Application Ser. No. 62/197,657, filed on Jul. 28, 2015 entitled "Systems and Methods for Determining Measurement Data of an Item," the entirety of which is incorporated by reference herein.

FIELD

The present concepts relate generally to the measurement of items for sale, and more specifically, to a system and method for determining a volume and weight of a three-dimensional item from an image of the item.

BACKGROUND

Mobile electronic devices such as smartphones are increasingly being used in a store shopping experience. For example, modern smartphones can store shopping lists, provide electronic coupons that can be scanned at the phone display, and displays advertisements when the shopper is near a store item.

BRIEF SUMMARY

In one aspect, a method for determining a weight of an item for purchase, comprises determining from a digital image of an item generated by a single camera a volume of the item, the single camera separated from the item at a distance in a horizontal and vertical direction established by a stationary rigid fixture; identifying the item; accessing a database to determine an average weight per volume measurement unit of the identified item; and calculating a weight of the item from the volume and the average weight per volume measurement unit.

In some embodiments, the item is a store produce item having an irregular shape.

In some embodiments, determining the volume of the item comprises: determining an average area of the item; determining an average depth of the item; and determining an average volume by multiplying the average area by the average depth.

In some embodiments, the volume is approximated within two standard deviations using three different sub calculations.

In some embodiments, determining the average area includes employing at least two mirrors to calculate multiple areas of the item.

In some embodiments, the multiple areas of the item include: a first area of a front view of the image; a second area of a right reflective view of the image; and a third area of a left reflective view of the image.

In some embodiments, the average depth is determined from an average of pixel widths of the front view, right respective view, and left reflective view.

In some embodiments, the height is determined by multiplying an apparent height and a factor of a distance of the item from the camera and a pitch of the camera to the item.

In some embodiments, determining a height of the item includes determining a resolution of the camera, and determining a correction ratio of pixel to millimeters.

In some embodiments, determining the volume further comprises calculating a distance from the camera to the item by locking a focal length of the camera to a particular distance to provide a constant distance for applications for the basis of all other calculations.

In some embodiments, the item is identified systematically, optically, or manually.

In some embodiments, the method further comprises positioning the item on an apparatus having a base and a fixture; positioning the camera on the fixture a predetermined distance from the item; and generating the digital image of the item.

In another aspect, a system for determining a weight of an item for purchase, comprises a single camera that generates a digital image of the item; at least two mirrors for determining an average volume of the item; an optical recognition device that identifies the item; a memory that stores an average weight per volume measurement unit of the identified item; and a special-purpose processor that calculates an estimated weight of the item from the approximate volume and the average weight per volume measurement unit.

In some embodiments, the at least two mirrors are arranged to provide a front view, a right view, and a left view of the image.

In some embodiments, the system further comprises a volume calculator that determines an area of the item from each of the front view, the right view, and the left view of the image, and determines an average of the three areas.

In some embodiments, the volume calculator determines an average depth of the image for determining the volume.

In some embodiments, the system further comprises an optical recognition device that identifies the produce item, and wherein the weight of the produce item is determined from a result of the optical recognition device and the volume.

In another aspect, a method for determining a volume and weight of a produce item, comprises extrapolating a length, width, and depth of a produce item from a two-dimensional image of the produce item; determining a volume from a combination of the length, width, and depth of the produce item; and determining a weight of the item from the volume.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill in the art that the systems and methods can be practiced without at least some of the details. In some instances, known features or processes are not described in detail so as to not obscure the present invention.

Embodiments of the present concepts relate to the use of an electronic device such as a smartphone for determining a volume, weight, or other measurement of an item, for example, a produce item such as a bundle of bananas, or other store items that require such measurement data in order to determine a value of the item. The user's electronic device can be used to determine a volume and weight of a three-dimensional store item from an image of the item. More specifically, systems and methods are provided that determine a volume by extrapolating the length, width, and depth of irregular shaped items from a 2 dimensional image. Conventional approaches require a scale or other physical device for determining the weight of such items. Conventional scanning applications on smartphones or the like are not currently practical with certain store items such as produce items which must first be weighed to determine a sale price of the item.

A typical application may include a store customer downloading an application onto a smartphone or other mobile electronic device having a camera, placing a store item of interest on an apparatus having a base and a fixture, placing the smartphone on the fixture a predetermined distance from the item, taking a picture of the item from the camera on the smartphone, and receiving a display of an appropriate weight and cost of the item.

Figure 1:
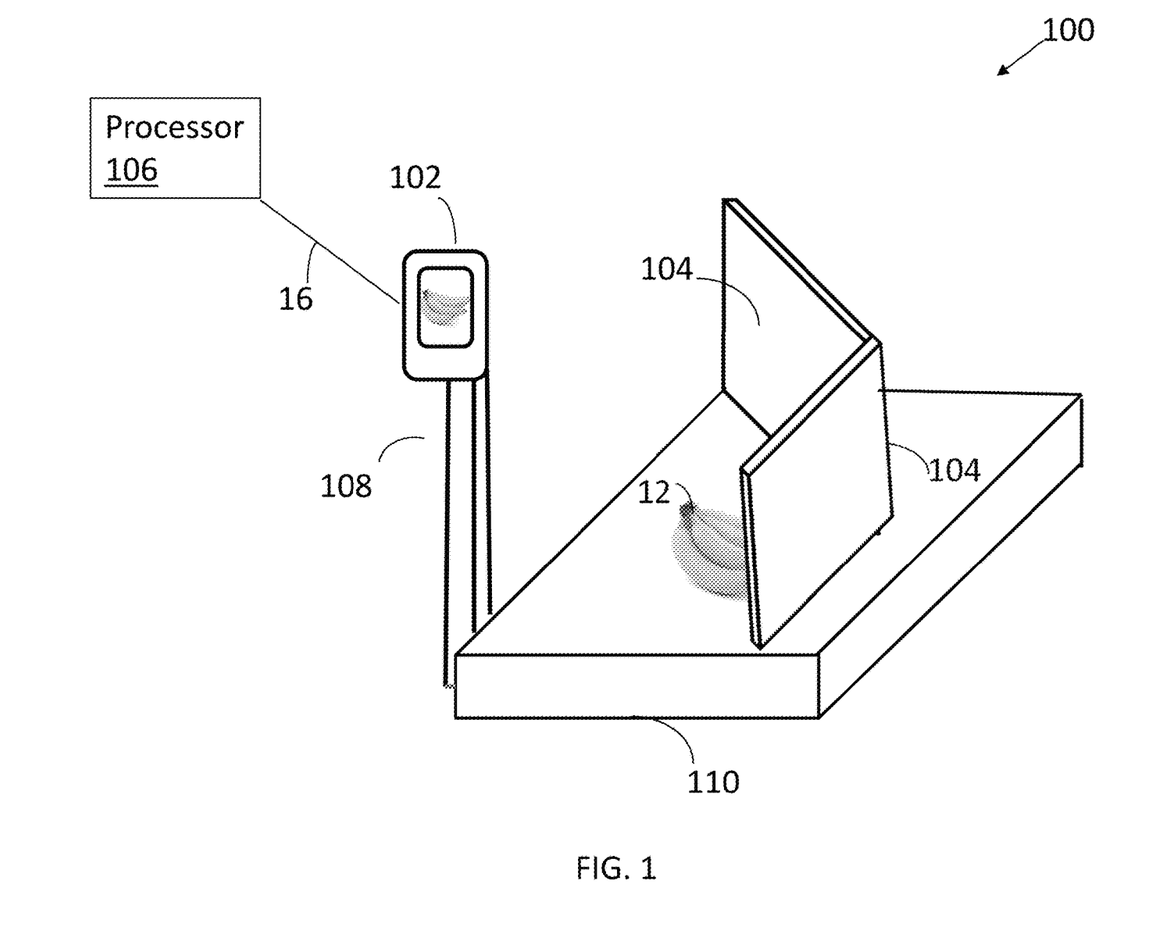
FIG. 1 is an illustrative side view of a system for measuring an item, in accordance with some embodiments.

FIG. 1 is an illustrative side view of a system 100 for measuring an item, in accordance with some embodiments.

The system 100 includes a mobile electronic device 102, a mirror set 104, and a processor 106, which permit a user to take a digital image, i.e., picture, of an item 12 or object, and calculate from the digital image the weight of the item 12. Although a mobile electronic device is referred to herein, other electronic devices may equally apply that are not necessarily mobile, but may be stationary. Also, although mirrors are referred to herein, alternative devices may equally apply such as video screens or other elements that can capture or provide different views of items of interest.

Figure 2:
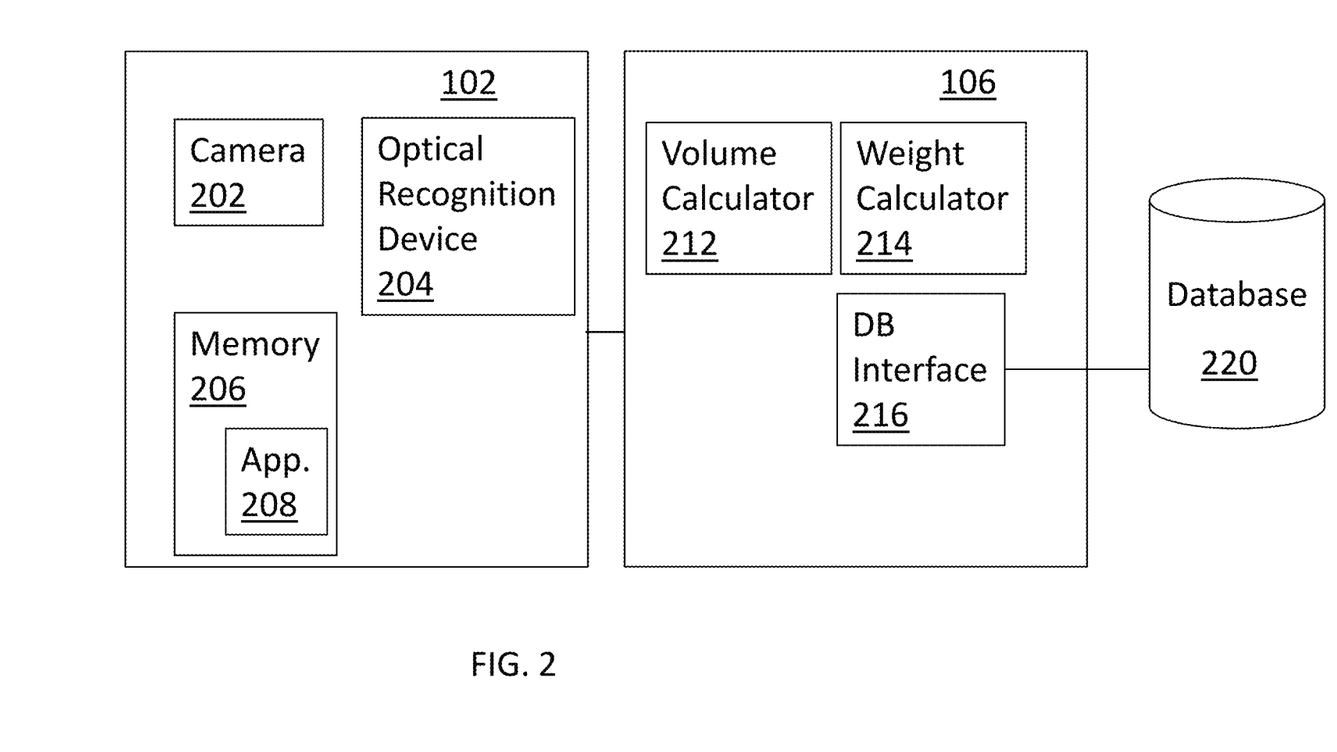
FIG. 2 is a block diagram of elements of the system of FIG. 1, in accordance with some embodiments.

As shown in FIG. 2, the mobile electronic device 102 includes a camera 202 or related sensor for detecting the item 12 and encoding digital images of the item 12. The camera 202 can be digital camera, camera phone, tablet, electronic notebook, laptop computer, or other related device having a camera or related charge coupled device (CCD) or complementary metal oxide semiconductor (CMOS) device for collecting emitted light related to the item 12.

The system 100 can include a fixture 108 that attaches to the camera 202, or as shown in FIG. 1, to the mobile electronic device 102 housing the camera 202. The fixture 108 can extend from a base 110, or from a stationary object such as a tabletop or floor on which the item of interest 12, for example, a bunch of bananas, is positioned and one or more digital images taken by the camera 202. The mirror set 104 can be positioned on the base 110 or other stationary object at a predetermined distance from the fixture 108 and camera 202, which permits the item of interest 12, for example, shown in FIG. 4 as a produce item, to be positioned in the field of view of the camera 202 so that a single image can be taken of the item 12 for determining its volume. The item 12 of interest may be positioned between the reflective surface of the mirror set 104 and the camera 202. A single image is taken by the camera 202 that may capture multiple angles by way of the mirrors 104. For example, by arranging the mirror set 104 about a periphery of the item 12, the sides and back of the item 12 may be visible in a single image taken by a camera facing a front of the item 12. As shown in FIGS. 4A-4C and 5A-5C, the three sides are shown illustrating that three different views may be provided, e.g., front, left, and right views respectively, which may be used for performing volume calculations according to some embodiments.

The processor 106 determines an estimated weight of a produce item based on its volume, which in turn is determined by estimating surface areas of the produce item 12 from images taken by the mobile electronic device 102.

To achieve this, the processor 106 may execute an application stored in memory (not shown) that determines the resolution capability of the camera 202, for example, by communicating with the firmware of the device it is loaded on. The processor 106 can determine with the given pixel density and the known distance from the item 12 a size, for example, how many millimeters, each pixel represents. The processor 106 may then measure the number of pixels in each view of the item (e.g., front, right, and left views shown in FIGS. 4A-4C and 5A-5C) and calculate the area in pixels for that view, e.g., areas a1, a2, and a3 shown in FIGS. 4A-4C, 5A-5C respectively. The processor 106 may then multiply the number of pixels by the calculated amount of pixels per millimeter to determine the number of square millimeters the pixels represent. The foregoing steps may be performed for each view, for example, shown in FIGS. 4A-4C, then sum those areas together and divide by number of areas, e.g., (a1+a2+a3)/3, to determine the average area for the item 12.

The processor 106 may then count the number of pixels along the average horizontal axis of the three sides and use that number as the depth of the item and then multiply the depth by the average area to determine the volume, for example, in cubic millimeters. The processor 106 may then access a database of known weights per cubic millimeter for a set of items, select the item 12 from the stored item data, and multiply known weight value by the calculated volume to determine an estimated weight of the item 12 shown in the image. In some embodiments, the processor 106 may multiply the weight of the item 12 by the retail price per pound of the item 12 to determine the total cost of the item 12.

FIG. 2 is a block diagram of elements of the system of FIG. 1, in accordance with some embodiments.

In addition to a camera 202, the mobile electronic device 102 can include optical recognition technology 204 and a memory 206. Some or all of these elements may be at the mobile electronic device 102. In other embodiments, some of these elements may be located externally from the mobile electronic device 102 and communicate with each other and/or other elements of the system via a network or other communication path, for example, wired or wireless signals. The optical recognition technology 204 is constructed to instantly recognize objects such as the item 12. The mobile electronic device 102 can include a processor (not shown) and memory 206. Stored in the memory 206 can include one or more applications 208 executable by the device processor. One application 208 may include recognition software that works with the camera 202 and/or optical recognition technology 204 or related device for identifying the item 12. Alternatively, a standalone optical recognition device may be provided, which is physically separate from the mobile electronic device 102.

Data related to the identified item 12 may be compared to contents of a database 220 to determine the identity of the item 12, and other information such as the item's weight per square millimeter. An accurate value can be generated, for example, by a computer processor, in response to using optical recognition to identify the item 12. The accuracy value may be used for any number of purposes, for example, compared to a threshold value to establish a degree of confidence that the item 12 is correctly identified. A product code such as a PLU number may be provided to identify the item when the accuracy value is greater than a predetermined threshold. The identification of the item 12 could be obtained through optical recognition, a manually input number such as a PLU, a scanned barcode, QR code, RFID, or any unique identifier for the item 12. Alternatively, or in addition, the item 12 can be identified systematically, optically, or manually.

The processor 106 can include a volume calculator 212, a weight calculator 214, and a database interface 216. Some or all of these elements may be physically collocated at the processor 106, for example, stored at a common memory and executed by a hardware processor. In other embodiments, at least some of these elements may be located externally from the processor 106, for example, located at the mobile device 102 or standalone computer, and communicate with each other and/or other elements of the system via a network or other communication path, for example, wired or wireless signals.

The volume calculator 212 calculates an approximate volume of the item 12 from a depth, width, and height of the item 12. The volume is calculated based on pixel density instead of length, for example, millimeters or inches. The volume can be approximated within two standard deviations. The volume is determined by calculating the average width or depth of the item 12 being photographed, and multiplying it by the average area of the item 12. To account for irregular shapes, such as the bananas shown in FIG. 1, the areas of multiple sides of the bananas may be determined using the mirror set 104 to compensate for differences at each vantage point.

The weight calculator 214 determines an approximate weight of the item 12 from the calculated volume and average weight per volume, for example, weight per cubic millimeter determined from results retrieved from the database 220, using the results generated by the optical recognition device 204. The database interface 216 establishes a communication between the database 220 and the weight calculator 214.

Figure 3:
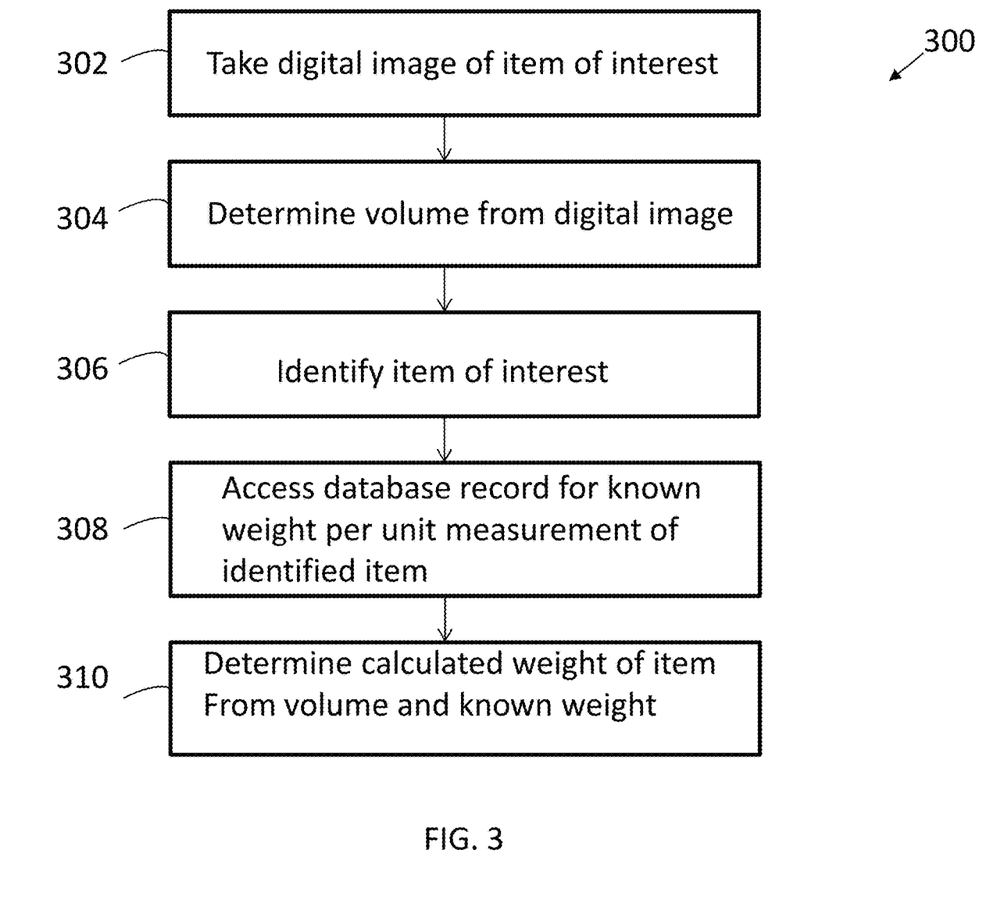
FIG. 3 is flow diagram of a method for determining measurement data of an item, in accordance with some embodiments.

FIG. 3 is flow diagram of a method for determining measurement data of an item, in accordance with some embodiments.

At block 302, the camera 202 generates a digitized image of the item 12, which can be stored at a memory on the mobile electronic device 102 or at a remote location. The three views are essential for measuring irregular shapes. By determining an average area, it compensates for the extremes that may be encountered on objects that may have both convex and concave features.

At block 304, a volume of the item 12 is determined from the digital image generated at block 302, for example, by multiplying the average area by the depth of the item. Due to differing capabilities of camera resolution, the volume can be determined based on pixel density or related measurement, for example, by the processor 106 described in FIG. 1. In doing so, the distance between the camera 202 and the item 12 may be calculated. This can be accomplished by locking the camera focal length to a specific distance, namely, a distance to the item 12. For example, the focal length can be locked to 1 meter, whereby the camera 202 can only have items in the field of view that are 1 meter away in focus. The establishing, or locking, the focal length of the camera 202 to a specific distance, the camera 202 can capture images of the item 12 at a predetermined distance. By setting the focal length the application will always have that distance as a known constant so it can calculation all the other measurements as a factorial of its distance from the item 12. The fixture 108 separated by the mirror set 104 at a predetermined distance also allows a distance of the camera 202 at the fixture 108 from the item 12 positioned between the fixture 18 and the mirror 104 to be determined, so that the camera is sufficiently focused. the fixture 18 and camera mount are specific distances so despite what device is being used or camera resolution, the application will always know exactly how far away the item 12 is that is being measured.

Also, in determining volume, the height of the item 12 may be determined. The volume calculator 212 or a phone application 208 can determine the resolution or related feature of the camera 202 when taking a picture of the item 12. This information may be determined from bios information stored at the camera 202. Once the volume calculator 212 receives data regarding camera resolution and/or the related camera-related information, the volume calculator 212 can determine a correction ratio of pixels to square millimeters for determining an area of each view. To achieve this, the fixture 108 can be used that holds the camera 202 at a correct angle and distance from the item to allow a constant, for example, the distance between the camera and item being photographed as well as the angle the picture is being captured (to ensure an acceptable view of both mirror reflections is provided, to be factored into the calculation of the item volume. A height may be determined by multiplying an apparent height and a factor of a distance of the item from the camera and a pitch of the camera to the item.

For example, the distance between the camera 202 on the fixture 208 and the item 12 can be determined to be 1 m. Also, the camera 202 may be determined to be a 10 megapixel camera, and has a field of view at 1 m is 2.5 m high×1 m wide. Here, each pixel can be calculated to represent 0.25 square millimeters (sq. mm.) (for example, using well-known calculations (Eq. (1)) of 25 million sq. mm/10 million pixels).

$$h = \frac{a}{d} \qquad \text{Eq. (1)}$$

where h is the apparent height, d is the distance of the object, and a is the actual size of the object. To determine a "true" height of an object in the distance, the apparent height may be multiplied by the distance the object is from the camera 202. Apparent height is the observable relative height of an item at various distances. The apparent height appears to be smaller the further away it is. The true height on the other hand is the actual physical height of an item and is not relative to how far away it is.

To account for odd or irregular shapes for produce items or other items of interest of which an image is taken by the camera 202, the area of at least three sides or other surfaces are determined to compensate for differences of each vantage point. The two mirrors 104A, 104B of the mirror set 104 are arranged to provide additional views of the item 12 to the camera 202, and allows the volume calculator 212 to calculate the visible area of the other views provided by reflected images of the other views. The angle of the captured image allows for the camera 202 to see the whole front of the item 12, and both reflections in both mirrors 104.

Figure 4A:
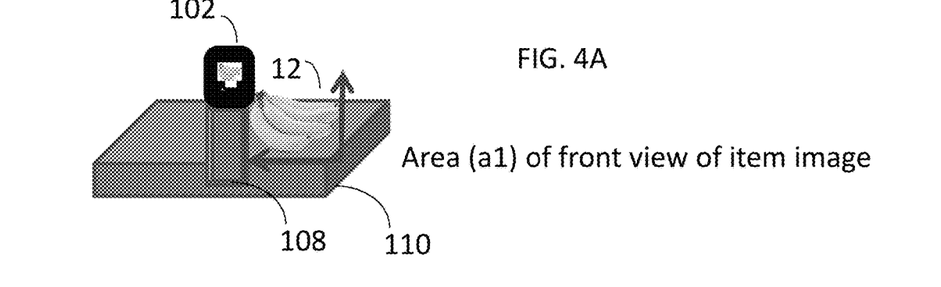
FIGS. 4A-4C are illustrative views of the system of FIG. 1 where an image of an item is captured at different vantage points for determining multiple areas of the item, in accordance with some embodiments.
Figure 4B:
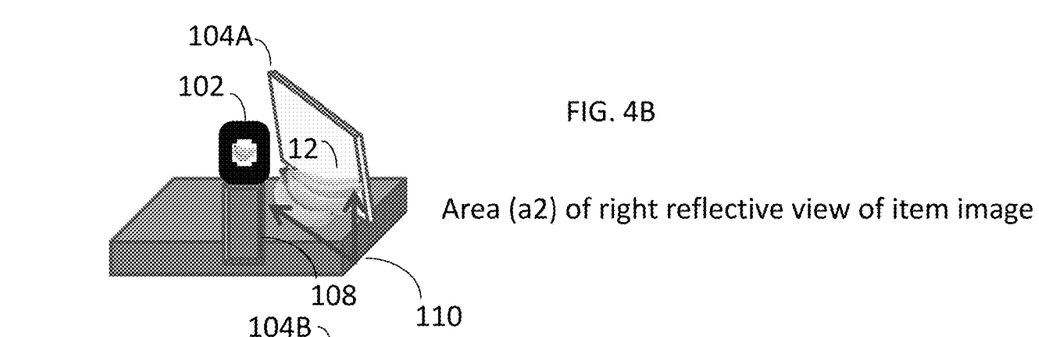
Figure 4C:
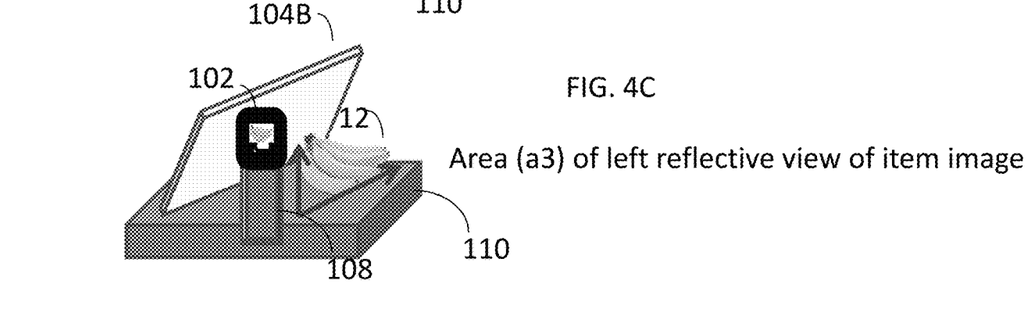

For example, as shown in FIGS. 4A-4C, the vantage points may include (1) a front facing image to determine an area of the item 12 from this vantage point, (2) a right facing reflection taking by a first mirror 104A to determine an area from this vantage point, (3) a left facing reflection taking by a second mirror 104B to determine an area from this vantage point. The mirror set 104A, B (generally, 104) is employed on the base 110, from a center of the fixture 108 behind the item 12 being measured. The system then parses out the front view, right facing reflection, and left facing reflection to determine the area for each side. More specifically, the system may parse the x, y, and z axis from the single image of the item 12. In FIG. 4A, the system excludes the reflected images by the mirrors 104 as part of the area (a1) calculation. In FIG. 4B, the image of the item reflected by the right mirror 104A is considered for calculating area (a2). In FIG. 4C, the image of the item reflected by the left mirror 104B is considered for calculating area (a3). Thus, to provide a more accurate projection of the actual volume of the item, the volume calculator 212 calculates an area of each of the three views, i.e., the front view facing the camera 202 and the two views provided by the mirrors 104, and calculates an average of the three views to determine the volume of the item 12. Also, the system determines the width of each view of the item 12 and determines an average width to be used as the depth. The average area is multiplied by the average depth to calculate the volume.

In sum, the volume calculator 212 calculates the area of each of the multiple views by pixel density, then averages the three calculated areas together to determine an overall average area of the item which takes into account the irregular shape of the items.

Figure 5A:
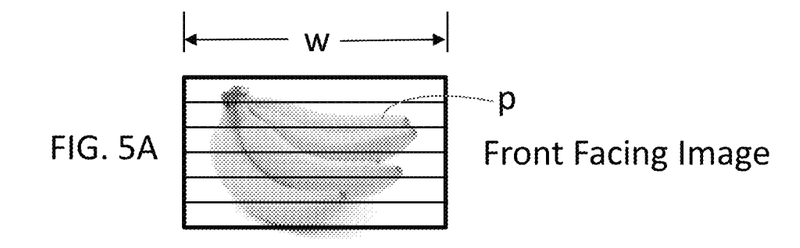
FIGS. 5A-5C are front, left, and right views of the item shown in FIGS. 4A-4C, in accordance with some embodiments.

For example, a front view of the bundle of bananas shown in FIGS. 4A and 5A comprises an area (a1) having 15,000 pixels. A second view shown in FIGS. 4B and 5B comprises an area (a2) having 14,500 pixels. A third view shown in FIGS. 4C and 5C comprises an area (a3) having 18,000 pixels. The average area of the pixels of the three viewed areas is 15,833 pixels, each pixel having a size of 0.25 sq. mm., as established above, or 3958 sq. mm.

The volume calculator 212 also calculates a depth of the item 12. Since the item 12 has varying depths at different heights, an average depth is calculated with its corresponding average width based on the average width of each side. The depth is determined by perspective views, for example, shown in FIGS. 4A-4C, 5A-5C. For example, a front view of an image of an item has a width and height. If the item is rotated 90 degrees, then the width shown from the front view is the depth of the rotated item. The processor 106 calculates the average width (w) from the three perspective views (front, left, right), thereby determining the effective depth of the item 12 to use in the volume calculation.

Figure 5B:
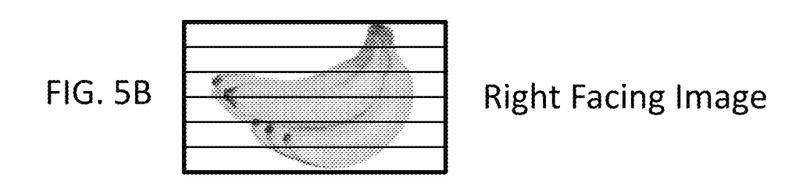
Figure 5C:
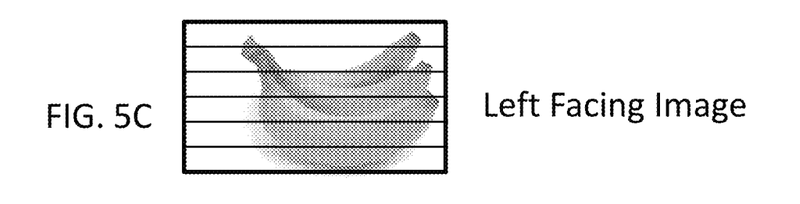

The volume calculator 212 determines the weighted average width on each of the three image views, for example, referring again to FIGS. 5A-C, by measuring the number of pixels it takes to span the width (w) at one or more sections, or slices, of the image views, then calculating an average width of each section (p), or slice. FIGS. 5A-5C illustrate the measurement of width, and the manner in which this is achieved is by performing a calculation that averages the pixel length at each slice of width of the item image. The measurement is the calculation of the average width, the unit of measurement may be by in units of pixels (instead of mm or inches). After the average width in number of pixels is generated, by all the slices from all the sides may be averaged, and a calculation may be performed to change the measurement from pixels to mm or fraction thereof. In some embodiments, as shown in FIG. 5, (w) and (p) are synonymous.

Referring again to FIGS. 4A and 5A, a section may be, on average, 1600 pixels wide, or 400 mm (1600 pixels×0.25 mm/pixel). In FIGS. 4B and 5B, a section may be, on average, 1500 pixels wide, or 375 mm (1500 pixels×0.25 mm/pixel). In FIGS. 4C and 5C, a section may be, on average, 1800 pixels wide, or 450 mm (1800 pixels×0.25 mm/pixel). The volume calculator 212 may calculate an average of the three average pixel widths (w) to determine the average depth of the item. In this example: ((400 mm+375 mm+450 mm)/3)=408.33 mm.

The volume of the image of the item 12 is calculated by multiplying the average area by the average depth. In the example of FIGS. 4A-4C, it will be:

Area=3,958 sq. mm.
Depth=408.33 mm.
Volume=3,958 sq. mm.*408.33 mm.=1,616,170.15 cubic millimeters At block 306, the item 12 is identified, for example, by the optical recognition device 204.

At block 308, stored at the database 220 may include a directory of items and a predetermined average weight per cubic millimeter for each item. This information is stored in the database 220, and at block 308 a database record can be accessed for the known weight per cubic millimeter of bananas. In this example, the average cubic millimeter weight of a banana is 0.00000324 pounds per cubic millimeter.

At block 310, the weight of the bananas can be determined. The volume of the bananas shown in FIGS. 1 and 4A-4C can be determined by multiplying the average weight (0.00000324 pounds per cubic millimeter) by calculated volume (1,616,170.15 cubic millimeters)=5.236 pounds.

In FIG. 5 the intent is to show that we are trying to measure width, and the way we are going to do that is by averaging the pixel length at each slice of width of the item.

For example if a camera has 1080p resolution, so it has 1080 pixels along the horizontal axis and 720 pixels along the vertical axis, then the application would look at each of the 720 rows (slices) and see if the item is present in that row, if it is present in that row it would calculate how many of those 1080 horizontal pixels (width) are taken up by the item. Then it would average all the widths together to come up with the average width.

As will be appreciated by one skilled in the art, concepts may be embodied as a device, system, method, or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Computer program code for carrying out operations for the concepts may be written in any combination of one or more programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Concepts are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While concepts have been shown and described with reference to specific preferred embodiments, it should be understood by those skilled in the art that various changes in form and detail may be made therein without departing from the spirit and scope as defined by the following claims.

What is claimed is:

1. A method for determining a weight of an item for purchase, comprising:
   determining from a digital image of an non-symmetrical shaped item generated by a single camera a volume of the item in a stationary position on a stationary base, the single camera in front of the item in a stationary position and separated from the item at a distance in a horizontal and vertical direction established by a stationary rigid fixture, a first mirror on one side of the item, a second mirror on another side of the item, wherein determining the volume of the item comprises:
   determining a resolution of the single camera;
   determining a pixel characteristic relative to the item in response to determining the resolution of the single camera;
   capturing by the single camera a front facing image of the item;
   determining from a number of pixels in the front facing image a first area of the item;
   capturing by the single camera a right view image of the item reflected by the first mirror;
   determining from a number of pixels in the right view image a second area of the item;
   capturing by the single camera a left view image of the item reflected by the second mirror;
   determining from a number of pixels in the left view image a third area of the item;
   determining an average area of the first, second, and third areas;
   determining a first width of the item from the front facing image;
   determining a second width of the item from the right view image;
   determining a third width of the item from the left view image;
   determining an average depth of the item from an average width of the first, second, and third widths;
   determining the volume of the item from the average depth and the average area;
   identifying the item using an optical recognition apparatus;
   accessing a database to retrieve an average weight per volume measurement unit of the identified item; and
   calculating a weight of the item from the volume and the average weight per volume measurement unit.

2. The method of claim 1, wherein the height is determined by multiplying an apparent height and a factor of a distance of the item from the camera and a pitch of the camera to the item.

3. The method of claim 1, wherein determining a height of the item includes determining the resolution of the camera, and determining a correction ratio of pixel to millimeters.

4. The method of claim 1, wherein determining the volume further comprises calculating a distance from the camera to the item by locking a focal length of the camera to a particular distance to provide a constant distance for applications for the basis of all other calculations.

5. The method of claim 1, wherein the item is identified systematically, optically, or manually.

6. The method of claim 1, further comprising:
   positioning the item on an apparatus having stationary base and the stationary rigid fixture;
   positioning the single camera on the stationary rigid fixture a predetermined distance from the item; and
   generating a digital image including the front facing image, the left view image, and the right view image of the item.

* * * * *